(12) United States Patent
Obert et al.

(10) Patent No.: US 9,607,425 B2
(45) Date of Patent: Mar. 28, 2017

(54) RAY-BOX INTERSECTION TESTING USING DOT PRODUCT-BASED FIXED FUNCTION LOGIC

(71) Applicant: QUALCOMM Incorporated, San Diego, CA (US)

(72) Inventors: Juraj Obert, Orlando, FL (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 14/517,706

(22) Filed: Oct. 17, 2014

(65) Prior Publication Data

US 2016/0110910 A1  Apr. 21, 2016

(51) Int. Cl.
| | | |
|---|---|---|
| G06T 15/06 | (2011.01) | |
| G06T 15/00 | (2011.01) | |
| G06T 15/04 | (2011.01) | |
| G06T 15/80 | (2011.01) | |

(52) U.S. Cl.
CPC ............ G06T 15/06 (2013.01); G06T 15/005 (2013.01); G06T 15/04 (2013.01); G06T 15/80 (2013.01); *G06T 2200/28* (2013.01)

(58) Field of Classification Search
CPC ....... G06T 15/005; G06T 15/06; G06T 15/80; G06T 15/04; G06T 2200/28
USPC .......................................................... 345/426
See application file for complete search history.

(56) References Cited

U.S. PATENT DOCUMENTS

| 8,390,618 | B2 | 3/2013 | Reshetov | |
|---|---|---|---|---|
| 8,441,482 | B2 | 5/2013 | Ozdac et al. | |
| 8,520,021 | B2 * | 8/2013 | Zimmer | G06T 1/20 345/589 |
| 8,564,589 | B1 * | 10/2013 | Aila | G06T 15/06 345/418 |
| 8,791,945 | B2 * | 7/2014 | Clarberg | G06T 15/10 345/419 |
| 2014/0049539 | A1 | 2/2014 | Lee et al. | |
| 2014/0063016 | A1 | 3/2014 | Howson et al. | |

FOREIGN PATENT DOCUMENTS

EP           2336977 A1    6/2011

OTHER PUBLICATIONS

Feist et al., "Ray Tracing on CPUs," Free University of Berlin, Jan. 1, 2012, XP055232752, 29 pp, Retrieved from the Internet: URL: http://www.inf.fu-berlin.de/lehre/SS12/Sp-Par/download/FeistWende.pdf [retrieved on Dec. 2, 2015].
International Search Report and Written Opinion of International Application No. PCT/US2015/054055, mailed Dec. 11, 2015, 11 pp.
Kay et al., "Ray Tracing Complex Scenes," Proceedings of the 13th Annual Conference on Computer Graphics and Interactive Techniques, vol. 20, No. 4, SIGGRAPH '86, Aug. 18-22, 1986 (Jan. 1, 1986), XP055232751, 10 pp, ISBN: 978-0-89-791196-2.

\* cited by examiner

*Primary Examiner* — Phu K Nguyen
(74) *Attorney, Agent, or Firm* — Shumaker & Sieffert, P.A.

(57) ABSTRACT

A method and apparatus for ray tracing may include using texture pipeline hardware of a GPU to perform ray intersection testing for a first ray and a first shape. Using the texture pipeline hardware to perform ray intersection testing may include calculating a plurality of dot products with the texture pipeline hardware, and determining whether the first ray intersects the first shape based on the plurality of dot products.

15 Claims, 8 Drawing Sheets

RAY-BOX INTERSECTION TESTING USING DOT PRODUCT-BASED FIXED FUNCTION LOGIC

TECHNICAL FIELD

This disclosure relates to graphics processing, and more particularly to techniques for ray-box intersection testing.

BACKGROUND

Ray tracing is a computer graphics technique used to generate 3D images for display. More specifically, ray tracing is the process of tracing three-dimensional (3D) rays through a 3D scene and finding ray-primitive intersections so that a two-dimensional (2D) representation of the 3D scene may be displayed. One technique used in ray tracing is determining ray-triangle intersections. Given an input ray and a set of triangles, the goal of the algorithm is to determine which triangles are intersected by the ray, and/or a set of intersection points. In order to accelerate the ray tracing operation, primitives (e.g., triangles) are typically organized into an acceleration data structure (ADS) that hierarchically groups scene primitives.

Examples of accelerated data structures include a bounding volume hierarchy (BVH) tree, k-dimensional (KD) tree, grid, etc. The ADS may be recursively traversed by performing ray intersection tests on the hierarchy of scene primitives to determine the primitives of the scene that are intersected by the ray. In order to trace a ray through a BVH tree, two types of operations are typically used: ray-box intersection testing (e.g., ray-AABB (axis-aligned bounding box) intersection testing), and ray-triangle intersection testing.

SUMMARY

Techniques of this disclosure generally relate to ray tracing. For example, aspects of this disclosure generally relate to re-using hardware units in a texture pipeline of a graphics processing unit (GPU) to perform certain aspects of ray tracing, including, for example, ray-box intersection testing. In particular, in some examples, dot-product units of a texture unit of a rendering pipeline may be used during ray-box intersection testing.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Aspects of this disclosure generally relate to graphics processing. In some examples, the techniques may be related to ray-primitive intersection testing.

Aspects of this disclosure may relate to a method and apparatus for ray tracing that may include using texture pipeline hardware of a graphics processing unit (GPU) to perform ray intersection testing for a first ray and a first shape. Using the texture pipeline hardware to perform ray intersection testing may include calculating a plurality of dot products with the texture pipeline hardware, and determining whether the first ray intersects the first shape based on the plurality of dot products.

Figure 1:
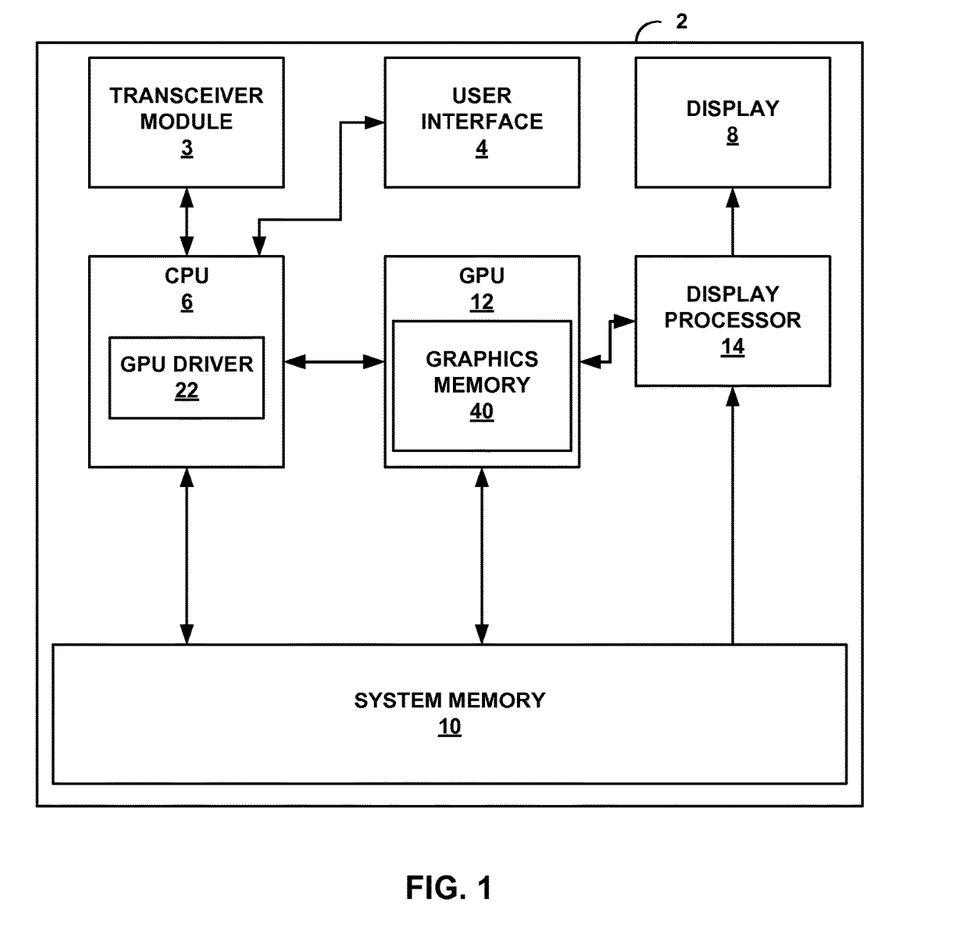
FIG. 1 is a block diagram illustrating an example system that may implement the techniques of this disclosure.

FIG. 1 is a block diagram illustrating an example system/computing device that may be configured to implement one or more aspects of this disclosure. As shown in FIG. 1, system/device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of device 2. A user may provide input to device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to device 2 via one or more input devices (not shown) such as a keyboard, a mouse, a microphone, a touch pad or another input device that is coupled to device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct 3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two dimensional (2D) and/or three dimensional (3D) graphics scenes) onto display 8 more quickly than drawing the scenes directly to display 8 using CPU 6.

GPU 12 may, in some instances, be integrated into a motherboard of device 2. In other instances, GPU 12 may be present on a graphics card that is installed in a port in the motherboard of device 2 or may be otherwise incorporated within a peripheral device configured to interoperate with device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may organize a plurality of primitives in a hierarchical data structure. GPU 12 may include a texture pipeline that is configured to calculate dot products, and to perform a ray intersection test (e.g., a ray-box intersection test) based on the calculated dot products.

Figure 2:
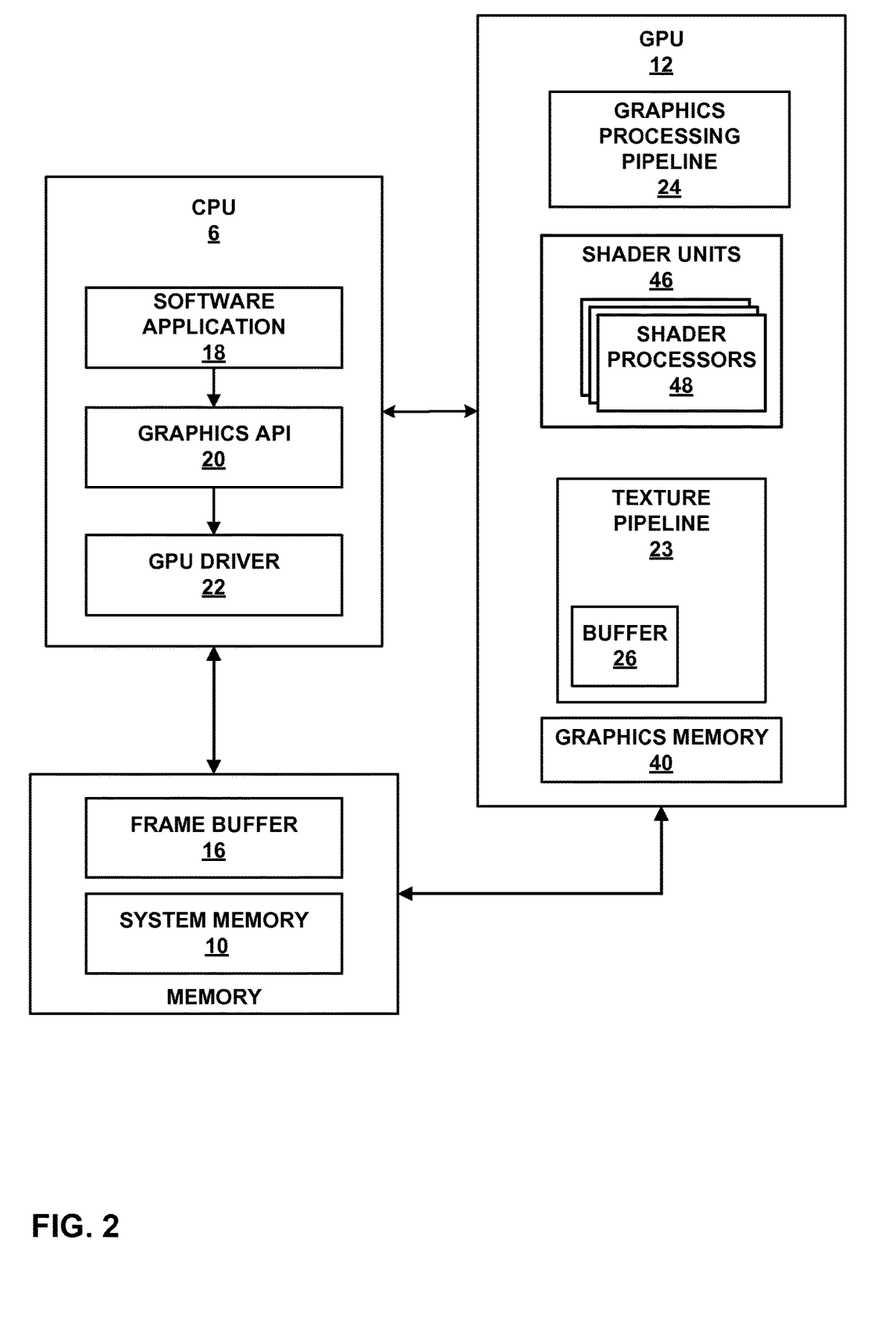
FIG. 2 is a block diagram illustrating an example of the system of FIG. 1 that may implement the techniques of this disclosure.

FIG. 2 is a block diagram illustrating example implementations of CPU 6, GPU 12, and system memory 10 of FIG. 1 in further detail. As shown in FIG. 2, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, graphics processing pipeline 24 decodes the command and configures graphics processing pipeline 24 to perform the operation specified in the command. For example, input-assembler 26 in graphics processing pipeline 24 may read primitive data and assemble the data into primitives for use by the other graphics pipeline stages in graphics processing pipeline 24. After performing the specified operations, graphics processing pipeline 24 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Although frame buffer 16 and system memory 10 are illustrated as being separate memory units, in other examples, frame buffer 16 may be part of system memory 10.

In some examples, GPU 12 includes shader units 46, graphics processing pipeline 24, texture pipeline 23, and graphics memory 40. One or more shader programs may execute on shader units 46 in GPU 12. Shader units 46 may include processor cores 48, each of which may include one or more components for fetching and decoding operations, one or more arithmetic logic units for carrying out arithmetic calculations, one or more memories, caches, and registers.

GPU 12 may designate shader units 46 to perform a variety of shading operations such as vertex shading, hull shading, domain shading, geometry shading, pixel shading, and the like by sending commands to shader units 46 to execute one or more of a vertex shader stage, a hull shader stage, a domain shader stage, a geometry shader stage, and a pixel shader stage in graphics processing pipeline 24. In some examples, GPU driver 22 may be configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader units 46 to perform the functions of a domain shader stage, geometry shader programs that may be executed by shader units 46 to perform the functions of a geometry shader stage and/or pixel shader programs that may be executed by shader units 46 to perform the functions of a pixel shader. A vertex shader program may control the execution of a programmable vertex shader unit or a unified shader unit, and include instructions that specify one or more per-vertex operations.

Graphics memory 40 is storage or memory that physically integrated into the integrated circuit of GPU 12. Graphics memory 40 may store an ADS that hierarchically groups scene primitives (e.g., triangles). In some examples, the ADS may be stored in system memory 10, in shader memory of shader units 46 or in shared system/graphics memory (not shown). GPU 12 may organize a plurality of primitives in the ADS.

Texture pipeline 23 is a programmable pipeline of hardware units that perform a texturing function. Texture pipeline 23 may include a number of hardware texturing units each in communication with a corresponding shader processor 48. In some examples, there is a one-to-one correspondence between shader processors 48 and corresponding hardware texturing units in texture pipeline 23.

Shader processors 48 may execute many instructions. When a shader processor 48 detects a texture processing instruction among the instruction, via an op code in a particular sub-field of the instruction, it sends a request to the corresponding texture unit in texture pipeline 23. The texture unit in texture pipeline 23, upon receiving the request from the corresponding shader processor 48, determines the type of texturing operation to perform based on the op code in the instruction, and performs the operation, which generally involves, inter alia, the calculation of dot products performed on specialized dot product hardware in texture pipeline 23. Texture pipeline 23 includes fixed-function hardware units that perform dot products natively. In some examples, pipeline 23 also includes fixed-function hardware units that perform minimum and maximum operations natively.

In some examples of the disclosure, a particular texture type is defined to be used to perform a ray intersection test in the texture pipeline 23. This "texture type" is not literally a texture type, but is more accurately a buffer type. In some examples, the corresponding shader processor 48 sends the information including the buffer type for ray intersection tests or an index to the buffer to the corresponding texture unit in texture pipeline 23, and the information may include information for the ray and the shape for which the ray intersection determines whether or not there is an intersection between the ray and the shape.

In some examples of the disclosure, texture pipeline 23 determines whether or not there is an intersection between the ray and the shape, and passes the results of the test back to the corresponding shader processor 48. In other examples, texture pipeline 23 performs a portion of the test rather than the entire test, or performs certain operations of the test rather than the entire test. In some examples, texture pipeline 23 performs the intersection check by performing operations such as calculating one or more dot products in specialized, fixed-function dot-product hardware in texture pipeline 23, and performing one or more minimum and/or maximum operations in specialized, fixed-function hardware in texture pipeline 23.

In some examples, the shape is a box, and texture pipeline 23 may be used for ray-box intersection testing. In some examples, the input information for the ray-box intersection testing is provided to texture pipeline 23. The input information may include, for example, bounding box information. In some examples, the bounding box information may be stored in buffer 26, which, in some examples, is a specialized linear buffer in the texture pipeline that may store many bounding boxes. Texture pipeline 23 indexes the bounding boxes in buffer 26 and retrieves a relevant bounding box from buffer 26 when needed.

In some examples, the basic block of the filtering pipe is a DP4 unit, which may perform a dot product of two 4-component vectors, with one 4-component vector for each RGBA pixel. In other examples, other architecture for pipeline 23 may be employed. In some examples, each DP4 unit performs a dot product for two four-component inputs, and one DP4 unit is implemented by two DP2 units that each performs a dot product for two two-component inputs.

Some examples of texture pipeline 23 use 4-component vectors employing four color channels: red, green, blue, and alpha.

In some examples, texture pipeline 23 employs bilinear texture filtering, and the bilinear filter contains four DP4 units.

Figure 3:
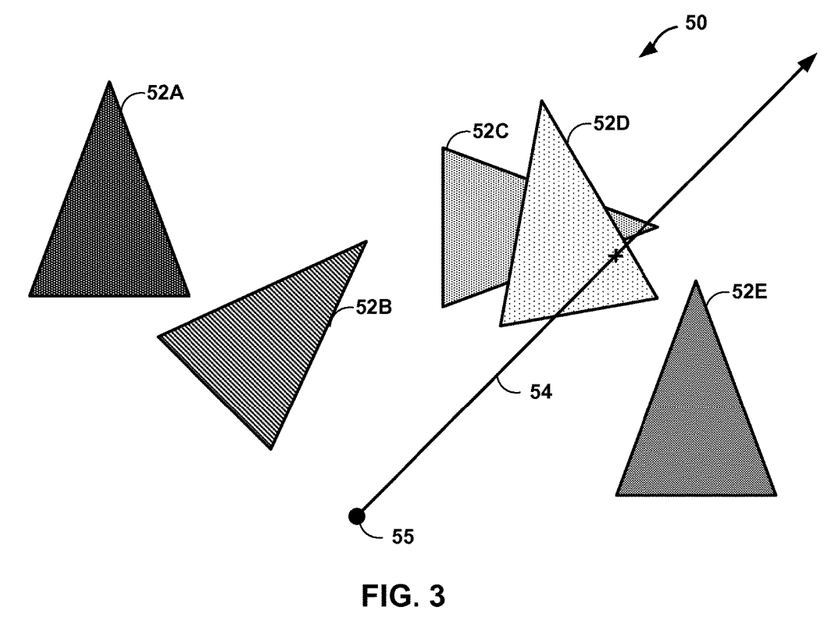
FIG. 3 is a conceptual diagram illustrating an example scene onto which a GPU may perform ray tracing.

FIG. 3 is a block diagram illustrating an example scene onto which GPU 12 may perform ray tracing. As shown in FIG. 3, scene 50 may be a 2D or 3D scene that includes primitives 52A-52E (hereafter "primitives 52"). As part of the ray tracing process, GPU 12 may determine, for ray 54, which may be a 2D or 3D ray, and which emanates from source 55, the primitives in primitives 52 of scene 50 that are intersected by ray 54.

Ray tracing is a computer graphics technique used to determine ray-triangle intersections. Given an input ray and a set of triangles, the goal of the algorithm is to determine which triangles are intersected by the ray. Different types of intersection queries can be made: Nearest-hit (NH) intersection; Any-hit intersection; and/or All intersections. In order to accelerate the ray tracing operation, triangles (primitives) are typically organized into an acceleration data structure (ADS), such as a bounding volume hierarchy (BVH) tree, KD tree, grid, etc.

BVH is an unbalanced binary tree with two types of nodes. Interior nodes are nodes that represent a region of space described by axis-aligned bounding boxes (AABB) and have two children. Leaf nodes are nodes that also represent a region of space, but do not have any children. Instead, they reference a set of triangles contained in the bounding box.

In some examples, in order to trace a ray through a BVH tree, two types of operations are required: ray-box intersection tests, and ray-triangle intersection tests. In typical scenes, the number of ray-box intersection tests is roughly five to twenty times greater than the number of ray-triangle intersection tests.

Figure 4:
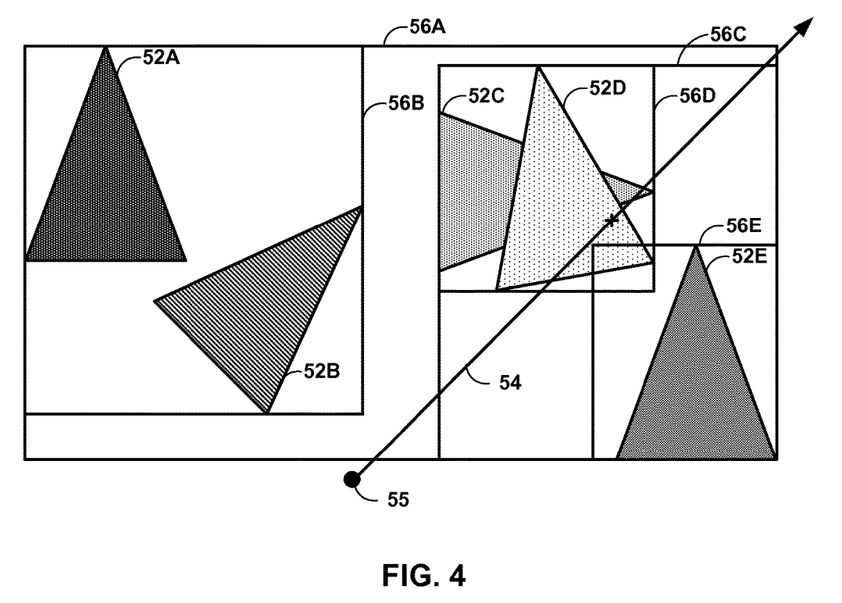
FIG. 4 is a conceptual diagram illustrating partitioning an example scene into bounding volumes.

GPU 12 may systematically determine the primitive in primitives 52 that is intersected by ray 54 by dividing scene 50, hierarchically arranging the divided portions of scene 50, and recursively traversing the hierarchy of the divided portions of scene 50. FIG. 4 is a block diagram illustrating partitioning scene 50 into bounding volumes. As shown in FIG. 4, GPU 12 may conceptually partition primitives 52 into bounding volumes. 56A-56E ("bounding volumes 56"). Bounding volumes 56 may be axis-aligned bounding boxes (AABBs), which may be bounding boxes having a minimized area within which all points of the enclosed primitives may lie. The bounding boxes may be axis-aligned such that the edges of the boxes may be parallel to the coordinate axis (e.g., the x, y, and z axis).

Bounding volume 56A may be a bounding box that bounds all primitives 52 of scene 50. Bounding volumes 56B and 56C may be subsets of bounding volume 56A in that bounding volumes 56B and 56C bound a subset of the portion of scene 50 bound by bounding volume 56A. Bounding volume 56B may bound primitives 52A and 52B, and bounding volume 56C may bound (i.e., spatially encompass) primitives 52C, 52D, and 52E. Bounding volumes 56D and 56E may be subsets of bounding volume 56C, and may bound a subset of the portion of scene 50 bound by bounding volume 56C. Bounding volume 56D may bound primitives 52C and 52D, and bounding volume 56E may bound primitive 52E.

In the example shown in FIG. 4, GPU 12 may partition primitives 52 into five bounding volumes 56. GPU 12 may use more than or fewer than five bounding volumes 56. For example GPU 12 may create additional bounding volumes as subsets of bounding volume 56B to individually bound primitives 52A and 52B, respectively. In some examples, CPU 6 may also be configured to partition primitives 52 into bounding volumes 56.

Figure 5:
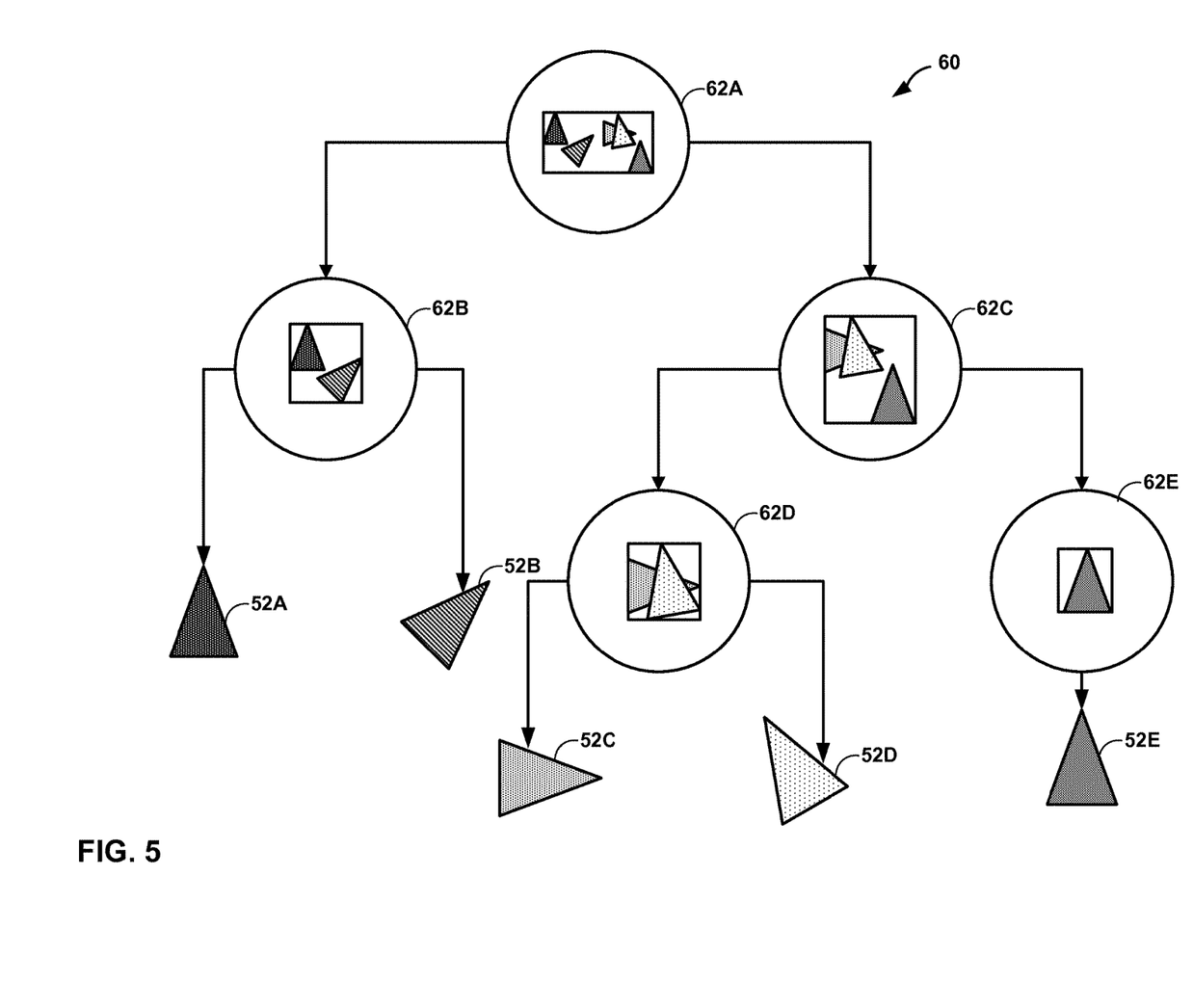
FIG. 5 is a conceptual diagram illustrating an example hierarchical data structure having nodes that are associated with the bounding volumes and the primitives shown in FIG. 4.

FIG. 5 illustrates an example hierarchical data structure having nodes that are associated with the bounding volumes 56 and primitives 52 shown in FIG. 4. As discussed above, scene primitives of a scene may be organized into ADS 41, and ADS 41 may be traversed to determine a ray-primitive intersection. GPU 12 may store ADS 41 in graphics memory 40. As shown in FIG. 5, bounding volumes 56 and primitives 52 may be associated with nodes of ADS 41, such as bounding volume hierarchy (BVH) tree 60, that is associated with scene 50. GPU 12 or CPU 6 may construct BVH tree 60 such that it may include nodes 62A-62E ("nodes 62") that are associated with bounding volumes 56 and primitives 52 in scene 50. More specifically, root node 62A, interior node 62C, and leaf nodes 62B, 62D, and 62E may each be associated with a bounding volume of bounding volumes 56. Nodes of BVH tree 60 other than root node 62A may be referred to as non-root nodes of BVH tree 60. For example, interior node 62C and leaf nodes 62B, 62D, and 62E may be referred to as non-root nodes of BVH tree 60. Leaf nodes 62B, 62D, and 62E may each be linked with at least one primitive of primitives 52. For example, leaf node 62B may be linked with primitives 52A and 52B, leaf node 62D may be linked with primitives 52C and 52D, and leaf node 62E may be linked with primitive 52E. BVH tree 60 may be considered an unbalanced binary tree because each non-leaf node of hierarchical data structure 60 has at most two child nodes, and because leaf nodes 62B, 62D, and 62E may have unequal depths.

Because bounding volume 56A bounds all primitives 52 of scene 50, GPU 12 may associate root node 62A with bounding volume 56A. GPU 12 may associate nodes 62B and 62C, which are child nodes of root node 62A, with bounding volumes 56B and 56C, respectively, because bounding volumes 56B and 56C are each subsets of bounding volume 56A. GPU 12 may link primitives 52A and 52B with node 62B, because bounding volume 56B associated with node 62B bounds primitives 52A and 52B, and because there are no additional bounding volumes that are subsets of bounding volume 56B.

GPU 12 may associate bounding volumes 56D and 56E with nodes 62D and 62E, which are child nodes of node 62C, because bounding volumes 56D and 56E are each subsets of bounding volume 56C associated with node 62C. GPU 12 may link primitives 52C and 52D with node 62D, because bounding volume 56D associated with node 62D bounds primitives 52C and 52D, and because there are no additional bounding volumes that are subsets of bounding volume 56D. GPU 12 may also link primitive 52E with node 62E, because bounding volume 56E associated with node 62E bounds primitive 52E, and because there are no additional bounding volumes that are subsets of bounding volume 56E.

GPU 12 may traverse BVH tree 60 to determine the primitive of primitive 52 that intersects ray 54 by performing ray-box intersection tests for the bounding volumes 56 associated with nodes 62 of BVH tree 60. GPU 12 may start traversal of BVH tree 60 by performing a ray-box intersection test for bounding volume 56A associated with root node 62A. If GPU 12 determines that ray 54 intersects bounded volume 56A, GPU 12 may continue to traverse BVH tree 60 to node 62B, and GPU 12 may perform a ray-box intersection test for bounding volume 56B associated with node 62B. If GPU 12 determines that ray 54 does not intersect bounded volume 56B, GPU 12 may recursively traverse BVH tree up to node 62A and down to node 62C, and GPU 12 may perform a ray-box intersection test for bounding volume 56C associated with node 62C. If GPU 12 determines that ray 54 intersects bounded volume 56C, GPU 12 may continue to traverse BVH tree 60 to node 62D, and GPU 12 may perform a ray-box intersection test for bounding volume 56D associated with node 62D. If GPU determines that ray 54 intersects bounded volume 56D, GPU 12 may perform a ray-primitive intersection tests for primitives linked to node 62D. Therefore, GPU 12 may perform a ray-primitive intersection test for primitive 52C and may also perform a ray-primitive intersection test for primitive 52D. GPU 12 may determine from the ray-primitive intersection test for primitive 52D that ray 54 does intersect primitive 52D. After GPU 12 determines that ray 54 does intersect primitive 52D, GPU 12 may continue to recursively traverse BVH tree 60 up to node 62C and down to 62E, and GPU 12 may perform a ray-box intersection test for bounding volume 56E associated with node 62E. GPU 12 may determine, based on the ray-box intersection test, that ray 54 does not intersect bounding volume 56E, thereby ending traversal of BVH tree 60 for ray 54.

Figure 6:
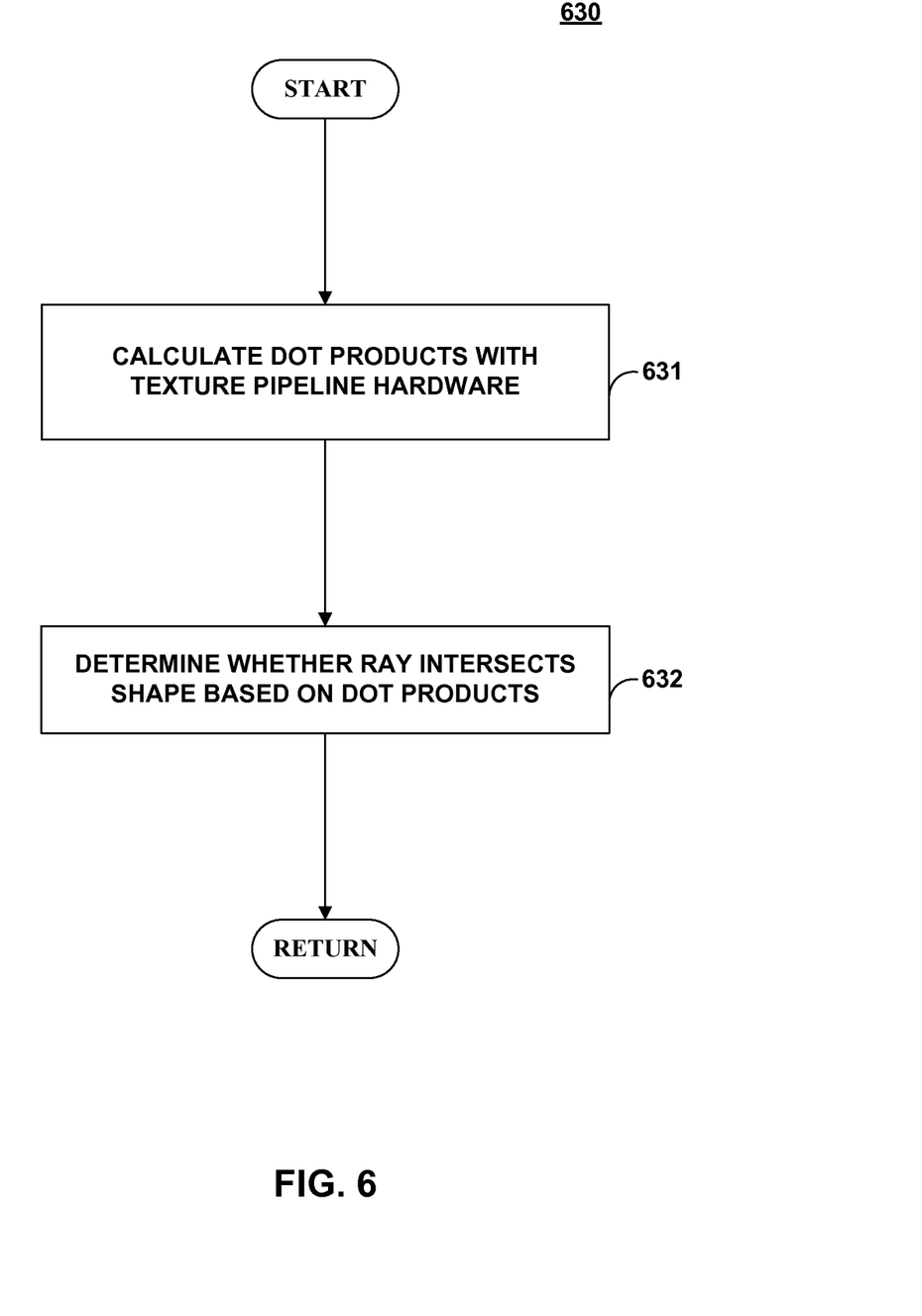
FIG. 6 is a flow diagram illustrating a process for ray tracing in accordance with the techniques of this disclosure.

FIG. 6 is a flow diagram illustrating an example process (630) for ray tracing, according to the techniques of this disclosure. In some examples, process 630 is a process of using texture pipeline hardware of a GPU to perform ray intersection testing for a first ray and a first shape. In some examples, the first shape may be a box, rectangle, or the like.

After a start block, the process proceeds to block 631, where a plurality of dot products are calculated using the texture pipeline hardware. The process then moves to block 632, where it is determined whether the first ray intersects the first shape based on the plurality of dot products. The process then advances to a return block, where other processing is resumed.

Specific examples of process 630 are discussed in greater detail below.

In some examples, process 630 is employed to perform ray-box intersection testing to determine whether or not the ray intersects the box. However, the techniques of the disclosure are not so limited, and in other examples, other shapes may be employed. In some examples, the intersection testing is between a ray and a rectangle.

In some examples, the texture pipeline hardware may receive bounding box information and the ray definition from the GPU (e.g., a shader processor or GPU driver), and perform dot-product operations and other operations. In some examples, the texture pipeline hardware will output the result of the intersection test (i.e., whether or not the first ray and the first shape intersect), along with any application data to be passed along (if any). In some examples, the output result of the intersection test is a Boolean value representing whether or not the ray and the shape intersect.

In some examples, a ray is represented by the ray origin (o) and the normalized direction vector (d) of the ray. A point on a ray can be expressed as: $r(t)=o+dt$, where t is from [0.0f, +inf). In some examples the direction vector is "normalized" by being defined as having a length of one.

A 3D axis-aligned bounding box is represented by two of its opposite corner points, bbMin (Xmin, Ymin, Zmin) and bbMax (Xmax, Ymax, Zmax). In some examples, bbMin and bbMax are two opposite corners where bbMin is the corner of the two opposite corners that is closest to the origin. The term "the origin" should not be confused in the term "ray origin"—"the origin" refers to the point at coordinates (0,0,0), whereas the term "ray origin" or "origin of the ray" refers the starting of the ray. That is, in geometry, a ray is defined as a line that starts at a given point and goes off infinitely in a particular direction—this starting point is referred to as the "origin of the ray", which is different than "the origin", which is the point at coordinate (0, 0, 0), although in some circumstances the origin of the ray could coincidentally be at the origin.

In process 630, the ray-shape intersection testing is performed by an algorithm which is formulated to use dot products, where the texture pipeline hardware is employed to perform the dot products used in the algorithm.

In some examples of ray-box intersection testing, the inputs to the algorithm are:
rayOrig—the coordinates of the origin of the ray
rayDirRcp—the reciprocal of the normalized ray direction
bbMin—coordinates of one corner of the bounding box
bbMax—coordinates of the corner of the bounding box opposite bbMin In some examples, the following distances may be computed by the following algorithms:

| | |
|---|---|
| t1.x | distance from the origin of the ray to the intersection point of the ray and plane x = bbMin.x |
| t1.y | distance from the origin of the ray to the intersection point of the ray and plane y = bbMin.y |
| t1.z | distance from the origin of the ray to the intersection point of the ray and plane z = bbMin.z |
| t2.x | distance from the origin of the ray to the intersection point of the ray and plane x = bbMax.x |
| t2.y | distance from the origin of the ray to the intersection point of the ray and plane y = bbMax.y |
| t2.z | distance from the origin of the ray to the intersection point of the ray and plane z = bbMax.z |

In some examples, the bounding box information may be stored in a specialized linear buffer in the texture pipeline, which may store many bounding boxes. In other examples, the specialized linear buffer may be stored in a suitable location other than the texture pipeline, such as the system memory, GPU memory, a specialized memory, and/or the like. The texturing unit indexes the bounding boxes in the buffer and retrieves a relevant bounding box from the buffer when needed.

In some examples, ray-box intersection testing may begin initially with an instruction that is processed by a shader processor. When the shader processor determines, based on the op code in a particular sub-field of the instruction, that the instruction is a texturing processing instruction, it sends the request to a texture unit that corresponds to the shader processor, where the texture unit is part of the texture pipeline. In some examples, ray-boy intersection tests employ a specially defined texture type (i.e., buffer type). The shader processor may send the texture unit information such as the origin of the ray, the direction of the ray, and an index to the bounding box information stored in the buffer. The texture pipeline may respond by accessing the information identified by the indices and then performing the ray-box intersection by employing an example of process 630. In some example, process 630 results in an indication as to whether or not the ray and the box intersect, such as a Boolean value indicating whether or not the ray and the box intersect. In some examples, the texture pipeline returns to the shader processor the Boolean value, and may also return other information such as application-specific data to the shader processor. In some examples, the application-specific data may include data related to traversing the ADS, such as pointers to the next children in the tree, and the like.

Examples of process 630 leverage filtering pipeline inside the texture pipeline. In some examples, the basic block of the filtering pipe is a DP4 unit, which may perform a dot product of two 4-component vectors.

Figure 7:
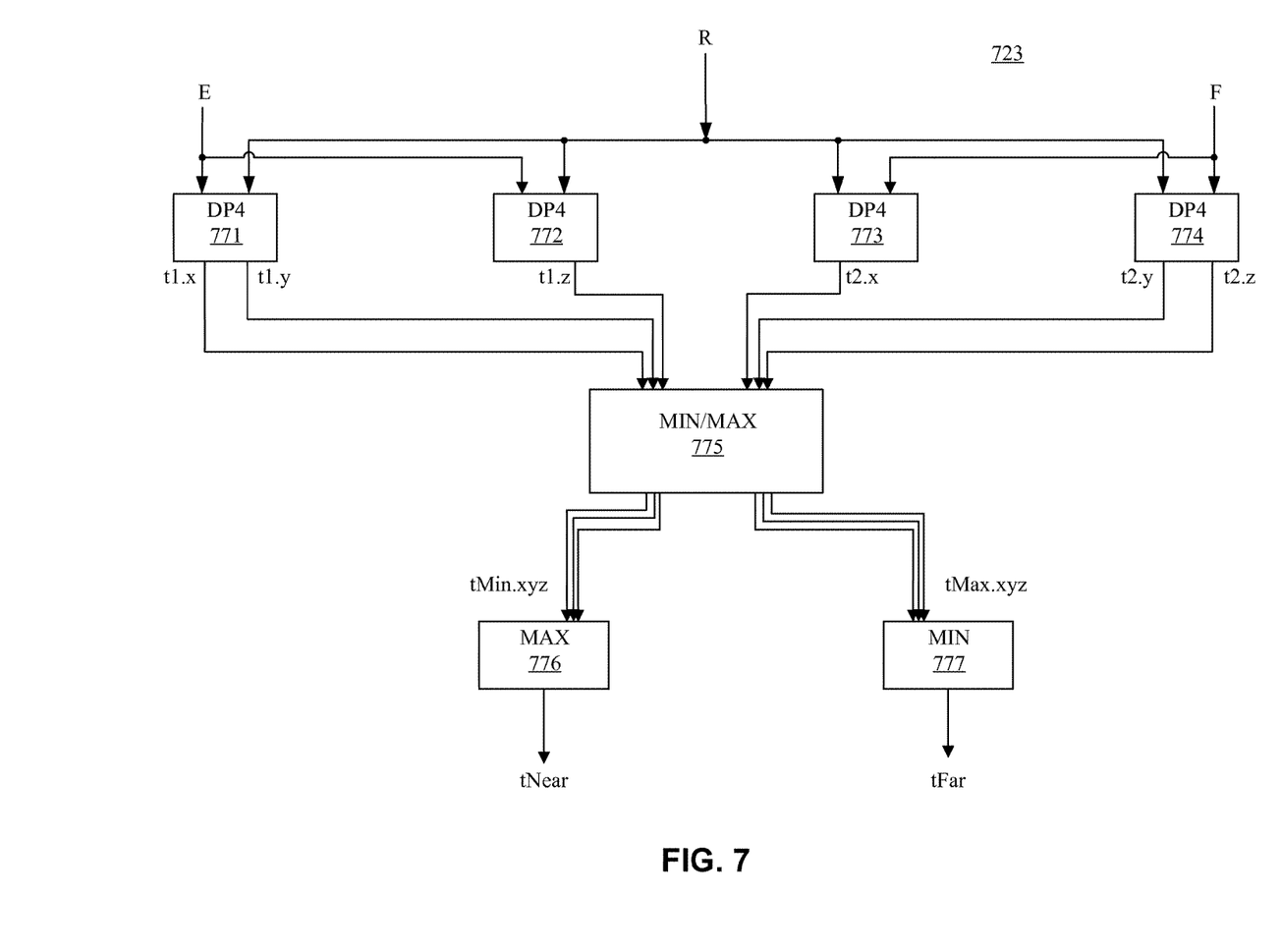
FIG. 7 is a block diagram illustrating an example of a filter pipeline that may be employed as a portion of the texture pipeline of FIG. 2.

FIG. 7 is a functional block diagram illustrating an example of filter pipeline 723, which may be employed as an example of a portion of texture pipeline 23 of FIG. 2. Filter pipeline 723 includes dot-product units 771-774, min/max block 775, max block 776, and min block 777.

Each of dot-product units 771-774 is configured to calculate a dot product. In some example, each dot-product unit 771-771 is a fixed-function dot-product hardware unit. Dot-product units 771-774 may operate as means for calculating a plurality of dot products with the texture pipeline hardware. Min/max block 775 is configured to perform a min/max function on the dot products generated by dot-product units 771-774. There are several examples of min/max functions that may be performed in various examples, with one exemplary version of the min/max function performed by min/max block 775 discussed in greater detail below. In some examples, min/max block 775 performs the min/max function to generate tMin.xyz and tMax.xyz from the dot products. Max block 776 performs a max function based on one or more outputs from min/max block 775, and min unit 777 performs a min function based on one or more outputs from min/max block 775. The outputs of max block 776 and min block 777 are used to determine the result of the ray-shape intersection shape, such as, in some examples, a Boolean value indicating whether or not there is an intersection between the ray and the shape. Blocks 775-777 may operate together as means for determining whether the ray intersects the shape based on the plurality of dot products calculated by dot-product units 771-774.

Although FIG. 7 shows four dot-product units 771-774, in other examples, more or fewer dot-product units may be employed. In some examples, three dot-product units may be employed rather than four.

In some examples, max block 776 performs a max function on tMin.xyz and outputs tNear as a result of the max function. Similarly, in some examples, min block 777 performs a min function on tMax.xyz and outputs tFar as a result of the max function. In some examples, tNear and tFar are employed to derive a Boolean value indicating whether or not there is an intersection between the ray and the shape.

In some examples, the texture pipeline includes fixed-function hardware units that perform dot products natively, which may correspond to dot-product units 771-774 in some examples. In some examples, the texture pipeline also includes fixed-function hardware units that perform minimum and maximum operations natively, which may correspond to blocks 775-777 in some examples.

In some examples, the algorithm for the ray-box intersection test may be performed as follows:

```
bool
intersectBB(float3 rayOrigin,
            float3 rayDirRcp,
            float3 bbMin,
            float3 bbMax)
{
   float3 t1 = (bbMin, −rayOrigin) · (rayDirRcp, rayDirRcp);
   float3 t2 = (bbMax, −rayOrigin) · (rayDirRcp, rayDirRcp);
   float3 tMin = min(t1, t2); // per-slab entry distances
   float3 tMax = max(t1, t2); // per-slab exit distances
   float tNear = max(max(tMin.x, tMin.y), tMin.z); // max entry distance
   float tFar = min(min(tMax.x, tMax.y), tMax.z); // min exit distance
   if ((tNear > tFar) || (tFar < 0.0f))
   {
      return false;
   }
   return true;
```

In the above example, the ● operator signifies a dot product of two 2-component vectors. The dot product is applied per-component (i.e. separately for the x-component, y-component and z-component). The scalar version is shown below.

```
float t1.x = (bbMin.x, −rayOrigin.x) · (rayDirRcp.x, rayDirRcp.x);
float t1.y = (bbMin.y, −rayOrigin.y) · (rayDirRcp.y, rayDirRcp.y);
float t1.z = (bbMin.z, −rayOrigin.z) · (rayDirRcp.z, rayDirRcp.z);
float t2.x = (bbMax.x, −rayOrigin.x) · (rayDirRcp.x, rayDirRcp.x);
float t2.y = (bbMax.y, −rayOrigin.y) · (rayDirRcp.y, rayDirRcp.y);
float t2.z = (bbMax.z, −rayOrigin.z) · (rayDirRcp.z, rayDirRcp.z);
```

As can be seen, the x-component of the vector t1 is calculated by performing a dot product of two vectors, where the first vector has an x-component having a value given by the x-component of bbMin, and a y-component have a value given by the negative of the x-component of the ray origin, and the second vector has an x-component given by the x-component of the normalized reciprocal ray direction vector, and a y-component given by the x-component of the normalized reciprocal ray direction vector. The y-component of the vector t1 is calculated by performing a dot product of two vectors, where the first vector has an x-component having a value given by the y-component of bbMin, and a y-component have a value given by the negative of the y-component of the ray origin, and the second vector has an x-component given by the y-component of the normalized reciprocal ray direction vector, and a y-component given by the y-component of the normalized reciprocal ray direction vector. The z-component of the vector t1 is calculated by performing a dot product of two vectors, where the first vector has an x-component having a value given by the z-component of bbMin, and a y-component have a value given by the negative of the z-component of the ray origin, and the second vector has an x-component given by the z-component of the normalized reciprocal ray direction vector, and a y-component given by the z-component of the normalized reciprocal ray direction vector.

The vector t2 is calculated in the same manner as the vector t1 except that bbMax is used in the place of bbMin.

As shown above, in some examples, after the dot product calculations, the vectors t1 and t2 are obtained. In some examples, minimum and maximum operations are performed on t1 and t2 to generate tMin and tMax. The value tMin is generated as a vector based on the minimum value of each corresponding component, while the value tMax is generated as a vector based on the maximum value of each corresponding component. That is, the x-value of tMin is the lesser of the x-coordinates of t1 and t2, the y-value of tMin is the lesser of the y-coordinates of t1 and t2, and the z-value of tMin is the lesser of the z-coordinates of t1 and t2. Similarly, the x value of tMax is the greater of the x-coordinates of t1 and t2, the y value of tMax is the greater of the y-coordinates of t1 and t2, and the z-value of tMax is the greater of the z-coordinates of t1 and t2.

The values of tNear and tFar are derived from tMin and tMax based on minimum and maximum determinations. The value tNear is a scalar value which is the maximum value from among the values of each component of the vector tMin. Similarly, the value tFar is a scalar value which is the minimum value from among the values of each component of the vector tMax.

The test is completed by a final comparison. If either tNear is greater than tFar or tFar is less than zero, the result in false, indicating the ray and the box do not intersect. Otherwise, the result is true, indicating that the ray and the box do intersect.

This final comparison compares the maximum entry distance and minimum exit distance to determine if they form a valid interval (i.e., entry distance<exit distance). The ray and the box intersect if the interval is valid and the exit distance is greater than the entry distance.

To make use of the texture pipeline hardware, in some examples, the computation is mapped onto the DP4 units in the filtering pipeline of the texture pipeline. As shown in FIG. 7, the following may be used as inputs to the ray-box intersection test in some examples, as follows.

E=(bbMin, −rayOrigin)
F=(bbMax, −rayOrigin)
R=(rayDirRcp, rayDirRcp)

In some examples, one or more of the DP4 units function to not only compute one dot product of two 4-component vectors, but also to compute two dot products of two 2-component vectors. In some examples, in order to calculate the slab distances, some of inputs to DP4s may be duplicated and some may remain unused. The table below shows the relevant connections in accordance with one example:

(node) size. In some examples, the bounding box information is addressable by the texture pipeline as a new "BVH" texture type. The bounding box information is addressed as a texture type even though it is not actually a texture; more accurately it may be referred to as a buffer type rather than a texture type.

In addition to a new texture type, a new texture pipeline "filtering" mode may perform ray-box intersection testing.

The texture pipeline is configured to accept the BVH texture type, and the format accommodates the following variables: rayOrigin, rayDirRcp, textureID, and node index.

In some examples, the result of the ray-box intersection test is a one-bit true/false value representing whether or not the ray and the box intersect. However, in some examples, the texture pipeline sends back more data than that to the shader processor.

In some examples, the BVH node structure contains a misc field that contains application-specific data. The misc field typically refers to information about where the next child node is, the number of triangles in a leaf node, and/or the like. The shader processor may use this information for the tree traversal. In some examples, this information is sent back to the shader processor along with the ray-box intersection test result.

Figure 8:
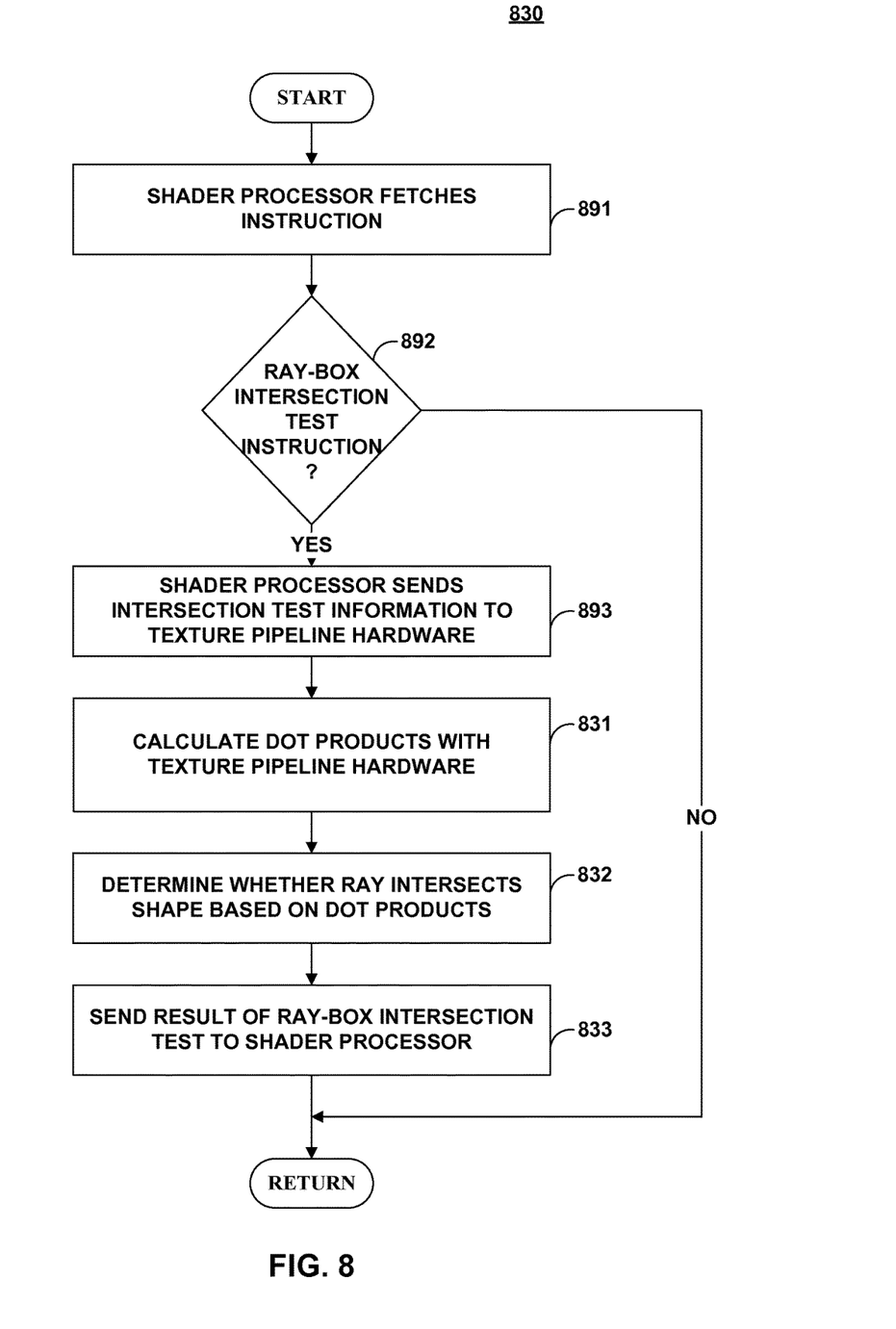
FIG. 8 is a flow diagram illustrating an example of the process of FIG. 6.

FIG. 8 is a flow diagram illustrating an example process (830) for ray tracing that may be employed as an example of process 630 of FIG. 6.

After a start block, the process proceeds to block 891, where a shader processor of the GPU fetches an instruction. The process then moves to block 892, where it is determined whether the fetched instruction is a ray-box intersection test instruction. If not, the process returns to a return block, where other processing is resumed.

If, however, the determination at decision block 892 is positive, the process advances to block 893, where the shader processor sends intersection test information to the texture pipeline hardware. In some examples, the intersection test information sent to the texture pipeline hardware may include information such as information such as the origin of the ray, the direction of the ray, and an index to the bounding box information stored in the buffer, and an index to the special buffer type for ray-box intersection testing.

| | c0 | w0 | c1 | w1 | c2 | w2 | c3 | w3 |
|---|---|---|---|---|---|---|---|---|
| DP4 #0 | bbMin.x | rayDirRcp.x | −rayOrigin.x | rayDirRcp.x | bbMin.y | rayDirRcp.y | −rayOrigin.y | rayDirRcp.y |
| DP4 #1 | bbMin.z | rayDirRcp.z | −rayOrigin.z | rayDirRcp.z | not used | not used | not used | not used |
| DP4 #2 | bbMax.x | rayDirRcp.x | −rayOrigin.x | rayDirRcp.x | not used | not used | not used | not used |
| DP4 #3 | bbMax.y | rayDirRcp.y | −rayOrigin.y | rayDirRcp.y | bbMax.z | rayDirRcp.z | −rayOrigin.z | rayDirRcp.z |

In some examples, in order to perform ray-box intersection testing, the texture pipe receives access to two kinds of input data—bounding box information and a ray definition.

In some examples, the ray definition and BVH node index is stored in shader processor registers and passed to the texture pipeline with each intersection request. In some examples, node indices are computed during the build process, and the texture pipeline computes the node address using linear addressing.

As discussed above, the bounding box information is contained inside each node of the BVH tree. In some examples, the bounding box information is stored in memory as linearized tree nodes each having a fixed element The process then proceeds to block 831, where texture pipeline hardware calculates a plurality of dot products. The process then moves to block 832, where the texture pipeline hardware determines whether the ray intersects the block based on the plurality of dot products. The process then proceeds to block 833, where the results of the ray-box intersection test are sent from the texture pipeline hardware to the shader processor. The process then advances to a return block, where other processing is resumed.

As previously discussed, with regard to determination block 892 at which a determination is made as to whether or not the instruction is a ray-box intersection test, an instruction may be identified as a ray-box intersection test instruction by having an op code identifying that it is a texture instruction. If the op code in the instruction is identified as indicating that the instruction is a texture processing instruction, then the determination at decision block 892 is positive.

Figure 9:
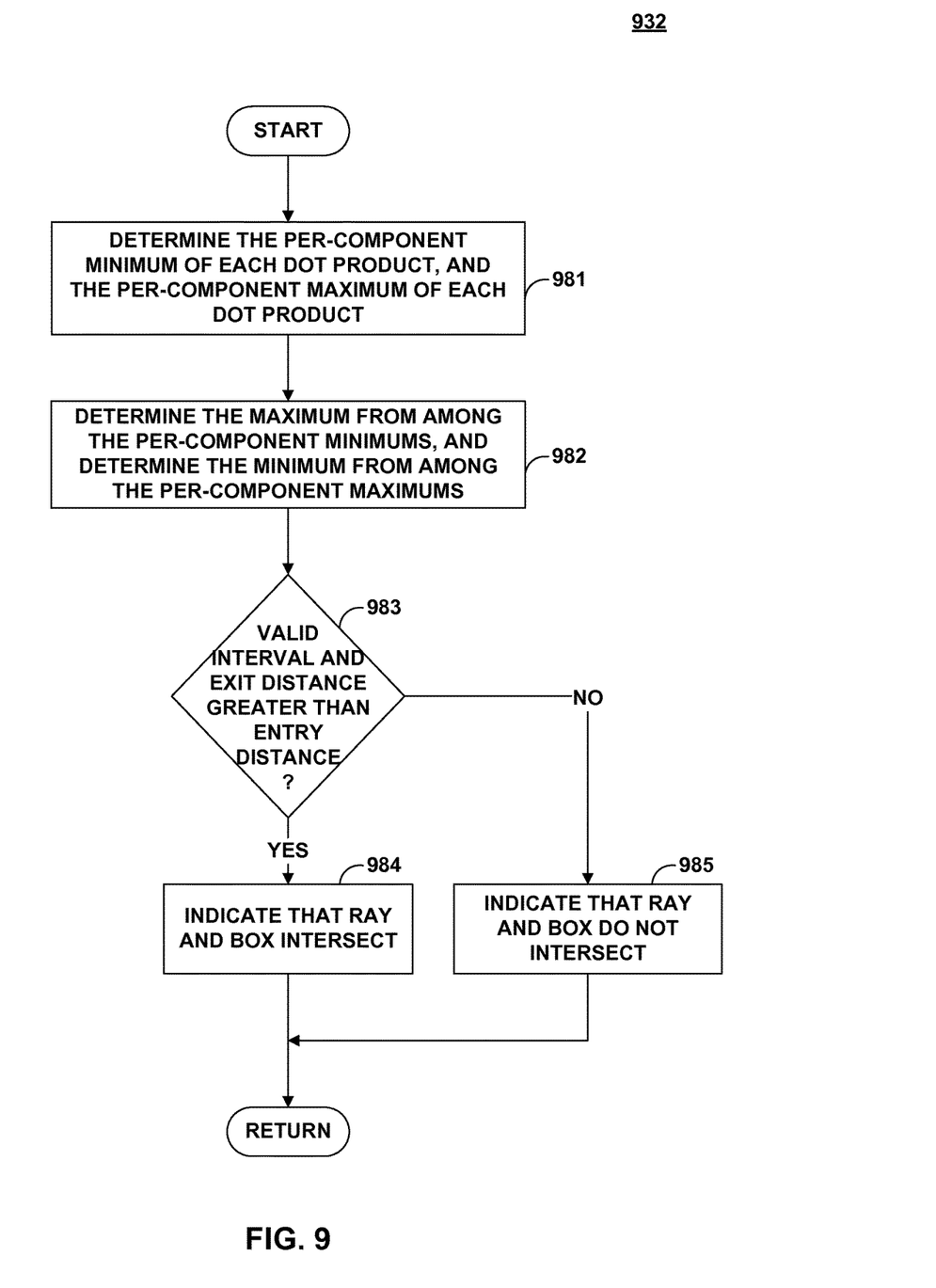
FIG. 9 is a flow diagram illustrating an example process for determining whether the ray intersects the box that may be employed as an example of a portion of the process of FIG. 6 and/or FIG. 8, in accordance with the techniques of this disclosure.

FIG. 9 is a flow diagram illustrating an example process (832) for determining whether the ray intersects the box that may be employed as an example of block 632 of FIG. 6 and/or block 832 of FIG. 8. After a start block, the process proceeds to block 981, where the texture pipeline hardware determines the per-component minimum of each dot product, and the per-component maximum of each dot product.

For instance, in some examples, the calculated dot products are two three-component vectors, each component having an x-component, a y-component, and a z-component. At block 981, the texture pipeline hardware determines a per-component minimum of each dot product, which may be given as tMin, so that the x-component of tMin is the minimum from among the x-component of each of the dot products, the y-component of tmin is the minimum from among the y-component of each of the dot-products, and the z-component of tMin is the minimum from among the y-component of each of the dot-products. Similarly, at block 981, the texture pipeline hardware determines a per-component maximum of each dot product, which may be given as tMax, so that the x-component of tMax is the maximum from among the x-component of each of the dot products, the y-component of tMax is the maximum from among the y-component of each of the dot-products, and the z-component of tMax is the maximum from among the y-component of each of the dot-products.

The process then moves to block 982, where the texture pipeline hardware determines the maximum from among the per-component minimums and the minimum from among the per-component maximums. As discussed above, a per-component minimum of each dot product was determined (at the previous block 981), which may be given as tMin, so that the x-component of tMin is the minimum from among the x-component of each of the dot products, the y-component of tMin is the minimum from among the y-component of each of the dot-products, and the z-component of tMin is the minimum from among the y-component of each of the dot-products. Accordingly, tMin is a vector having an x-component, a y-component, and a z-component. At block 982, the texture pipeline hardware determines the maximum of the value of the x-component of tMin, the value of the y-component of tMin, and the value z-component of tMin is determined, and assigns the value of tNear, which corresponds to the maximum entry distance.

Further, in some examples, the per-component maximum of each dot product was determined (at the previous block 981), which may be given as tMax, so that the x-component of tMax is the maximum from among the x-component of each of the dot products, the y-component of tMax is the maximum from among the y-component of each of the dot-products, and the z-component of tMax is the maximum from among the y-component of each of the dot-products. Accordingly, tMax is a vector having an x-component, a y-component, and a z-component. At block 982, the texture pipeline hardware determines the minimum of the value of the x-component of tMax, the value of the y-component of tMax, and the value z-component of tMax, and assigns the minimum as the value of tFar, which corresponds to the minimum exit distance.

The process then moves to decision block 983, where the texture pipeline hardware makes a determination as to whether there is a valid interval (i.e., tFar is not less than zero) and the exit distance (tFar) is greater than the entry distance (tNear). If so, the process advances to block 984, where the texture pipeline hardware indicates that the ray and the box intersect. The process then proceeds to a return block, where other processing is resumed.

If, however, the determination at decision block 983 is negative the process proceeds to block 985, where the texture pipeline hardware indicate that the ray and the box do not intersect. The process then proceeds to a return block, where other processing is resumed.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which does not include propagating signal per se or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or the like, but are instead directed to tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for ray tracing in graphics processing, the method comprising:
    receiving information defining a first shape and a first ray, the first shape being a bounding box;
    using texture pipeline hardware of a graphics processing unit to perform ray intersection testing for the first ray and the first shape, wherein the texture pipeline hardware is separate from a shader processor, wherein the texture pipeline hardware includes fixed-function hardware units configured to calculate dot products, and wherein performing the ray intersection testing includes:
        calculating, based on the information defining the first shape and the first ray, a plurality of distances with a plurality of dot products with the texture pipeline hardware; and
        determining whether the first ray intersects the first shape based on the calculated plurality of distances; and
    outputting, with the texture pipeline hardware, an indication of whether or not the first ray intersects the first shape based on the determination.

2. The method of claim 1, wherein the first shape is one of a box or a rectangle.

3. The method of claim 1, wherein the first shape is an axis-aligned bounding box.

4. The method of claim 1, wherein performing the ray intersection testing further comprises:
    performing at least one minimum calculation and at least one maximum calculation based on the plurality of dot products, where the determination as to whether the first ray intersects the first shape is based on the at least one minimum calculation and the at least one maximum calculation.

5. The method of claim 1, further comprising:
    determining, with the shader processor of the GPU for each of a plurality of instructions, whether the instruction is a ray-box intersection testing instruction; and
    for each instruction that is determined to be a ray-box intersection testing instruction, sending the information defining the first shape and the first ray to the texture pipeline hardware.

6. A device for ray tracing in graphics processing, the device comprising:
    a memory configured to store graphics data; and
    a graphics processing unit (GPU), including:
        at least one shader processor configured to process information relating to the graphics data, the information including information defining a first shape and a first ray, the first shape being a bounding box; and
        texture pipeline hardware configured to perform ray intersection testing for the first ray and the first shape, wherein the texture pipeline hardware is separate from the at least one shader processor, wherein the texture pipeline hardware includes fixed-function hardware units configured to calculate dot products, and wherein to perform the ray intersection testing the texture pipeline hardware is further configured to:
            receive the information defining the first shape and the first ray, the first shape being a bounding box;
            calculate, based on the information defining the first shape and the first ray, a plurality of distances with a plurality of dot products;
            determine whether the first ray intersects the first shape based on the calculated plurality of distances; and
            output, to the at least one shader processor, an indication of whether or not the first ray intersects the first shape based on the determination.

7. The device of claim 6, wherein the first shape is one of a box or a rectangle.

8. The device of claim 6, wherein the first shape is an axis-aligned bounding box.

9. The device of claim 6, wherein the texture pipeline hardware is further configured to:
    perform at least one minimum calculation and at least one maximum calculation based on the plurality of dot products, where the determination as whether the first ray intersects the first shape is based on the at least one minimum calculation and the at least one maximum calculation.

10. The device of claim 6, wherein the at least one shader processor is further configured to:
    determine, for each of a plurality of instructions, whether the instruction is a ray-box intersection testing instruction; and
    for each instruction that is determined to be a ray-box intersection testing instruction, send the information defining the first shape and the first ray to the texture pipeline hardware.

11. A graphics processing unit (GPU), including:
    at least one shader processor configured to process information relating to graphics data, the information including information defining a first shape and a first ray, the first shape being a bounding box; and
    texture pipeline hardware configured to perform ray intersection testing for the first ray and the first shape, wherein the texture pipeline hardware is separate from the at least one shader processor, wherein the texture pipeline hardware includes fixed-function hardware units configured to calculate dot products, and wherein to perform the ray intersection testing the texture pipeline hardware is further configured to:

receive the information defining the first shape and the first ray, the first shape being a bounding box;

calculate, based on the information defining the first shape and the first ray, a plurality of distances with a plurality of dot products;

determine whether the first ray intersects the first shape based on the calculated plurality of distances, and output, to the at least one shader processor, an indication of whether or not the first ray intersects the first shape based on the determination.

12. The GPU of claim 11, wherein the first shape is one of a box or a rectangle.

13. The GPU of claim 11, wherein the first shape is an axis-aligned bounding box.

14. The GPU of claim 11, wherein the texture pipeline hardware is further configured to:

perform at least one minimum calculation and at least one maximum calculation based on the plurality of dot products, where the determination as whether the first ray intersects the first shape is based on the at least one minimum calculation and the at least one maximum calculation.

15. The GPU of claim 11, wherein the at least one shader processor is further configured to:

determine, for each of a plurality of instructions, whether the instruction is a ray-box intersection testing instruction; and for each instruction that is determined to be a ray-box intersection testing instruction, send the information defining the first shape and the first ray to the texture pipeline hardware.

* * * * *